United States Patent
Cohen et al.

(10) Patent No.: US 7,483,522 B2
(45) Date of Patent: Jan. 27, 2009

(54) SPONSORED INFORMATION DISTRIBUTION METHOD AND APPARATUS

(75) Inventors: Marc A. Cohen, Blue Bell, PA (US); John J. Csaszar, Fleetwood, PA (US); Michael Cudemo, III, Downingtown, PA (US)

(73) Assignee: Voice FX International, Inc., Plymouth Meeting, PA (US)

( * ) Notice: Subject to any disclaimer, the term of this patent is extended or adjusted under 35 U.S.C. 154(b) by 424 days.

(21) Appl. No.: 11/257,747

(22) Filed: Oct. 25, 2005

(65) Prior Publication Data

US 2006/0072724 A1  Apr. 6, 2006

Related U.S. Application Data

(63) Continuation of application No. 09/420,002, filed on Oct. 18, 1999, now Pat. No. 7,006,606, which is a continuation-in-part of application No. 08/869,753, filed on Jun. 5, 1997, now Pat. No. 5,970,124.

(60) Provisional application No. 60/019,177, filed on Jun. 5, 1996, provisional application No. 60/023,258, filed on Aug. 9, 1996, provisional application No. 60/023,256, filed on Aug. 9, 1996, provisional application No. 60/024,006, filed on Aug. 15, 1996, provisional application No. 60/026,307, filed on Sep. 18, 1996.

(51) Int. Cl.
*H04M 1/64* (2006.01)

(52) U.S. Cl. .............. 379/88.22; 379/88.27; 379/93.12; 379/114.3; 704/260; 705/1; 707/3

(58) Field of Classification Search ................ 379/67.1, 379/88.25–88.27, 88.13, 88.17, 88.22, 114.13, 379/93.11, 93.12; 704/260; 705/1; 707/3–7, 707/9, 10; 725/42
See application file for complete search history.

(56) References Cited

U.S. PATENT DOCUMENTS

| 5,305,195 A | * | 4/1994 | Murphy ...................... 705/1 |
| 5,557,658 A | * | 9/1996 | Gregorek et al. ......... 379/88.25 |
| 6,018,710 A | * | 1/2000 | Wynblatt et al. ............ 704/260 |

* cited by examiner

*Primary Examiner*—Md S Elahee
(74) *Attorney, Agent, or Firm*—Roberts, Mardula & Wertheim, LLC

(57) ABSTRACT

A database having information sought by a consumer, a database containing consumer attributes, and a database of advertising messages are made responsive to telephone calls placed to an interactive voice response (IVR) system. Alternatively, the databases can be linked to a web site responsive to consumer input. Either system can deliver the advertising messages to the consumer. The database of consumer attributes contains information already known about the consumer that can be used to decide on which advertising message to deliver. The consumer initiates activity by calling the interactive voice response system or accessing the web site. Software identifies the consumer via the consumer-inputted identification and delivers an advertising message likely appeal to the consumer. The advertising message can include an offer to purchase a product or service. The offer can be taken during the advertising period and recorded so as to be sent to a sponsor. The system then disseminates information sought by the customer, such as student grades. Alternatively, software resident at the Web site reads the identity of the customer who is accessing the Web site and recognizes and ascribes various attributes to the customer. The customer has the opportunity to either view the information or, preferably, interactively respond to the advertisement or offer by seeking additional advertisements or by placing an order for the products or services of the sponsoring vendor.

28 Claims, 9 Drawing Sheets

SPONSORED INFORMATION DISTRIBUTION METHOD AND APPARATUS

This application is a continuation of Ser. No. 09/420,002, filed Oct. 18, 1999 now U.S. Pat. No. 7,006,606 which is a continuation-in-part of Ser. No. 08/869,753 filed Jun. 5, 1997, now U.S. Pat. No. 5,970,124 which claims the benefit of Provisional Application Ser. Nos. 60/019,177, filed Jun. 5, 1996 60/023,258, filed Aug. 9, 1996 60/023,256, filed Aug. 9, 1996 60/024,006, filed Aug. 15, 1996 and 60/026,307, filed Sep. 18, 1996 all of which are herein incorporated by reference.

BACKGROUND AND SUMMARY OF THE INVENTION

Interactive voice response (IVR) systems are answering machines that can interact with a caller and provide information 24 hours a day. Interactive voice response systems have found particular favor with large corporations that engage in large numbers of telephone transactions that involve disseminating essentially the same types of information to each caller. These systems can be updated frequently and automatically.

The technology employed by interactive voice response systems is often not economical for small institutions that do not maintain a high volume of telephone calls seeking a particular type of information. One example is a school or a university that seeks to use interactive voice response systems to report grades to their students. Reporting grades by telephone is extremely convenient for students. Students usually leave their campus at the end of each semester or quarter as quickly as possible—and often before professors have graded their final exams and reported them to their respective schools and universities. Telephone grade reporting allows students to know their grades without having to physically review posted grade sheets at the university or to wait, perhaps for months, for the university to mail the grades.

A problem that schools and universities encounter in using interactive voice response systems is how infrequently they are used intensively. Students need to find their grades by telephone only at the end of a quarter or semester. This message traffic can be quite heavy, but only for a few weeks of the year; schools and universities make no other use of their interactive voice response systems. The interactive voice response system still must be robust enough to support a high volume of phone calls. The equipment required to be purchased by a school or university to conduct grade reporting using interactive voice response system is therefore high. Furthermore, the interactive voice response industry is prone to rapid technological improvements such that interactive voice response systems quickly become obsolete.

Considerable economies of scale can be realized by combining the grade reporting requirements of several schools using a single set of interactive voice response equipment. However, different schools and universities often have automated grade reporting systems that are incompatible with each other as well as with interactive voice response systems. This system incompatibility presents a major problem in realizing significant economies of each scale since different schools and universities cannot share the use of the same interactive voice response equipment without extensive and expensive modifications.

It is known that the ability to target particular advertisements and offers to those consumers who are most apt to be interested in receiving such messages have great value to advertisers and marketers. Advertisers and marketers are often willing to pay a premium to reach consumers with advertisements and offers that are directed to their individual anticipated needs and interests. Direct advertisers and marketers have learned that consumers share particular attributes and often have comparable needs and interests based on certain demographic variables. Even more important, advertisers and marketers are willing to pay to have their offers and advertisements directed to the individuals who are most receptive.

It is a part of the present invention to recognize that the well known predispositions of advertisers and marketers to pay for well directed advertisements and offers can be used to offset the costs associated with providing interactive voice response systems to institutions, such as schools and universities, who use such systems intensively but infrequently. The advertisements and offers from multiple sponsors can be pooled at a common server. Likewise, grades from a number of different schools can be mapped into a common format that is suitable for use by interactive voice response equipment. In addition to grades, other demographic and sociological indications (collectively herein referred to as "attributes") can be supplied in addition to the grades. These student attributes can then be utilized to direct advertisements and offers to particular students. The advertising and offering process can be enhanced over time by using information derived from some students to enhance the advertisements and offers played to later students.

Further economies of scale can be realized by employing a single set of interactive voice response systems which can then be recycled among a number of different schools. In this way, individual schools are freed of the necessity to purchase their own interactive voice response equipment while advertisers and marketers are permitted access to the tastes and interests of individual students. Hence, schools, universities, and even individuals can offer interactive voice response technology where such offerings previously would not have been economically feasible.

One advantage of interactive voice response systems is that they can deliver information that consumers desire at any time and at low cost. Reporting course grades to students is only one example of the capability of the technology; each student desiring to know his or her grades for a semester can call a toll-free number that is connected to the interactive voice response system. Utilizing passwords or other forms of identification, the information can be delivered to a particular student quickly and with confidentiality. Students appreciate the ability to learn their grades from a remote location in advance of a formal grade report. Students and other consumers often do not object to having advertisers and marketers pay the cost of being able to access their grades. Indeed, students often enjoy the often creative advertisements and offers for products and services. Other forms of information dissemination in addition to grade reporting are also possible.

Even more important, interactive voice response equipment allows advertisers and marketers to adapt their messages to consumers. The revenue that these advertisers and marketers can be expected to be willing to pay could be used to offset the cost of disseminating information.

There is a need in the art to establish a way to direct advertising (the spoken word) and offers (the taking of orders) (herein collectively referred to as "advertising messages") to consumers using interactive voice response systems to particular target markets e.g., those individuals who are or are most likely to be most receptive to the information. There is also a need for a way to defer the expenses associated with interactive voice response systems. Among the objectives of the present invention are to solve these two problems.

It is a further objective of the present invention to solve these problems together. It is also an objective of the present invention to start with a database of information about various consumer characteristics, demographic and other characteristics and to direct advertising messages to these consumers based on these known attributes. The present invention also rewards vendors of goods or services for disseminating information, while allowing these vendors to direct their advertisements to those consumers whom they believe are most apt to have an interest in their products or services. It is also an objective of the present invention to convey information and advertising messages to consumers based on information that is already known about the consumer.

The present invention achieves these objectives, and others, by applying a database having information which the consumer desires to know, a database containing attributes of the consumer, and a database of advertisements that an interactive voice response system can deliver to a the consumer. The database of consumer attributes can contain information that is already known about the consumer. The consumer initiates activity by calling the interactive voice response system. Software identifies the consumer via the consumer inputted identification and plays an advertising message that, preferably, has been predetermined to have likely appeal to the consumer. The interactive voice response system is then used to disseminate the information sought by the customer (such as student grades) after first disseminating the advertising message.

The present invention has the particular advantage of individuals, schools and universities to disseminate grade information using interactive voice response technology which otherwise may be too expensive to maintain. Advertisers and marketers wanting to target advertising messages to the consumer using the interactive voice response system pay part or all of the cost of reporting the student's grades. The ability of advertisers and marketers to better direct advertisements to those customers who are most interested in the product or service being sold has great value to advertisers and marketers. Similarly consumers benefit because they perceive value in receiving advertisements or offers for the products or services which they may reasonably be expected to have an interest in purchasing. And consumers can avoid the advertising messages entirely simply by not calling.

One particularly efficient application of the present invention is in distributing grade reports to students. Students generally want to know their grades promptly at the end of every semester. Universities have the problems and costs associated with getting this information to students. Interactive voice response systems are a natural vehicle for disseminating grade information. Universities know many attributes of their students that have value to advertisers and marketers. For example, a university will know the sex, age, year in school, major course of study, address and additional attributes. Advertisers and marketers can direct advertising messages to students based on these known attributes without knowing the true identity of the person. For example, a consumer electronics company can market to engineering majors only, by advertising the price or opportunity to order, a specialized engineering calculator. Also, female oriented products can be marketed to females only. Advertising revenues can be used to offset the price of disseminating the grade reports.

The features necessary to implement the present invention include a database of attributes of particular individuals. Attributes can be supplied by the schools and mapped into a database so that the identity, and privacy, of the student is never known to an individual advertiser. The consumer can be assigned a password or similar identification which identifies his or her attributes. The consumer's attributes, however derived, must then be used to quickly and accurately select an advertisement of interest to the individual consumer. The sorting process needs to be flexible so as to accommodate the different interests of particular advertisers and marketers fast enough that consumers are not annoyed by any delay. One way of achieving this objective is to determine in advance of a call which advertising message to play, and in what order to play multiple messages, based on the consumer's known attributes.

The Internet and the World Wide Web (collectively "the Internet") are an interactive medium for information exchange. The Internet presently has over 30 million users and the number of users continues to grow rapidly. The Internet provides an interactive medium for the publication and dissemination of information on a global basis that is becoming a ubiquitous and fairly inexpensive telecommunications medium.

The interactive nature of the Internet makes it very attractive to advertisers and marketers. The Internet has the ability to give an individual access to a particular good or service, to make a sale and to deliver digital products and services such as software or information, and to do so inexpensively and in essentially real-time transaction sessions. The Internet allows customers to interact with advertisements as well as accept an offer on line and in real time. The interactivity of the Internet thus has the potential to save time and reduce costs for advertisers and marketers and consumers.

However, attempts at advertising and marketing on the Internet have thus far faced significant challenges. The Internet is predominately a publishing medium that does not provide sufficient facilities for commerce. For example, users of the Internet have a separate Internet identity that they can define and redefine each time they log on. The identity of Internet users is no more than a screen moniker or an e-mail address. Internet access companies often allow users to create multiple persona which effectively obscure their actual identity. This ambiguity results in Internet users being effectively anonymous. This anonymity, in turn, precludes vendors of goods and services from directing information, products and services to individuals who are most likely to desire them. Penetrating this anonymity is difficult under the best of circumstances and also raises issues concerning the privacy rights of users of the Internet.

Due to these difficulties, among others, marketing on the Internet is not yet efficient. Advertisers and marketers often receive a poor return for their advertising and marketing dollars, and consumers are increasingly frustrated by irrelevant advertising messages, "junk e-mail" and the like.

The problems associated with advertising and marketing on the Internet must be overcome before consumers and advertisers and marketers can realize the Internet's potential to improve efficiency, save time and effectively facilitate the transaction of business.

One of the great advantages of the Internet, World Wide Web and the like is the ability to deliver information that consumers desire. For example, the Internet can be used to report the course grades of students. Each student desiring to know his or her grades for a semester can log on to a Web site containing this information. Utilizing passwords and other forms of identification, the information can be delivered to the particular student in question only. Students appreciate the ability to learn their grades from a remote location in advance of a formal grade report. Students and other consumers often do not object to advertisers and marketers paying for student's access to their grade reports, and may enjoy the often creative advertisements and offers for products and services.

The Internet has the potential to allow advertisers and marketers to adapt their messages to consumers in essentially real time. The revenue that these advertisers and marketers can be expected to be willing to pay could be used to offset the cost of disseminating information. However, thus far, the ability of directed advertising and directed marketing to pay for information dissemination has been effectively blocked by the essentially anonymous nature of access to the Internet.

There is a need in the art to establish a way to direct advertising (the display of a banner) and offers (the taking of orders) (herein collectively referred to as "advertising messages") over the Internet to particular target markets e.g., those individuals who are or are most likely to be most receptive to the information. There is also a need for a way to defer the expenses associated with disseminating information over the Internet. Among the objectives of the present invention are to solve these two problems. It is a further objective of the present invention to solve these problems together in a way that the art has thus far failed to appreciate. It is also an objective of the present invention to start with a database of information about various consumer characteristics, demographic and other characteristics (collectively herein referred to as consumer "attributes") and to direct advertising messages to these consumers based on these known attributes. It is also an objective of the present invention to increase the number and type of known consumer attributes by recording how each individual consumer expresses his or her preferences over time. It is also an objective of the present invention to reward users of the Internet, World Wide Web and the like (collectively herein referred to as "consumers") for providing information about themselves by providing them in return with access to information which they desire. It is also an objective of the present invention to convey information and advertising messages to consumers based on information that is already known about the consumer or which the consumer voluntarily supplies about himself or herself. It is also an objective of the present invention to market to consumers in real time based on the information which they supply in real time.

The present invention achieves these objectives, and others, by creating or using, hereinafter referred to as "applying", a database having information which the consumer desires to know, a database containing attributes of the consumer, and a database of advertisements that the internet can deliver to that potential consumer. The database of consumer attributes can contain information that is already known about the consumer, information which the consumer supplies in response to questions, information gained by cross referencing the database with other databases, and information gained by observing the consumer's ongoing responses to advertising messages or hot link choices. Data links connect to the databases from the Internet site in any of a variety of ways such as hard wired, intranet or via the Internet. The consumer initiates activity by contacting the Web site. Software identifies the consumer via the consumer inputted identification and locates the known attributes of the consumer or receives attributes input by the consumer. Software uses these attributes to select an advertising message for the internet to transmit to the customer. The Internet is also used to disseminate the information sought by the customer (such as student grades). The customer has the opportunity to view the information and advertising message and, in the case of an offer, interactively respond to the advertiser's message by seeking additional advertising or by placing an order for the products or services of the sponsor.

The present invention has the particular advantage of permitting information to be distributed over the Internet which is otherwise too expensive to, for example, compile, cross reference format, verify or disseminate freely. Advertisers and marketers wanting to target advertising messages to the consumer over the Internet pay part or all of the cost of dissemination. Consumers supply their personal attributes for use in the "virtual" world of "cyberspace" in many instances without their being required to divulge their actual identities. The ability of advertisers and marketers to better direct advertisements to those customers who are most interested in the product or service being sold has great value to advertisers and marketers. Similarly consumers benefit because they perceive value in receiving advertisements or offers for the products or services which they may reasonably be expected to have an interest in purchasing. And consumers can avoid the advertising messages entirely simply by not logging on to the Web site.

One application of the present invention is in distributing grade reports to students. The Internet is a natural vehicle for disseminating grade information. For example, a university will know sex, age, year in school, major course of study, address and additional attributes. Advertisers and marketers are able to direct advertisements to students based on these known attributes or on additional student provided attributes with or without knowing the true identity of the person. Advertising revenues can be used to offset the price of creating the Web site and of updating and disseminating the grade reporting information. The present invention can be used to disseminate any type of information.

The features necessary to implement the present invention include a database of attributes of particular individuals. Attributes can already be known, residing in the database or can be supplied by the consumer, gleaned by observing the responses to advertising messages or hot link choices, by cross referencing other databases, or by any combination of these methods. The consumer can be assigned a password or similar identification which identifies his or her attributes. The consumer's attributes, however derived, must then be used to quickly and accurately select an advertisement of interest to the individual consumer. The sorting process needs to be flexible so as to accommodate the different interests of particular advertisers and marketers fast enough that consumers are not annoyed by any delay. The link between the attributes of a given internet user and their true identity can be secured so as to maintain the privacy of the individual if such privacy is desired or required.

It is advantageous to maintain a record of the attributes of consumers who access a particular database so that advertisers and marketers have assurance that their advertising messages are being targeted to those consumers who are most apt to have an interest in the particular goods or services. It is also advantageous to record how many times a particular advertising message meets the desired target audience. These advantages are easily obtained with the present invention by maintaining a network between the interactive voice response equipment and a separate server that stores which advertising message to play and then transmits its instructions.

The foregoing objectives, features and advantages of the present invention, and others in addition, are illustrated below with the aid of the drawings and detailed description.

DETAILED DESCRIPTION

Figure 1:
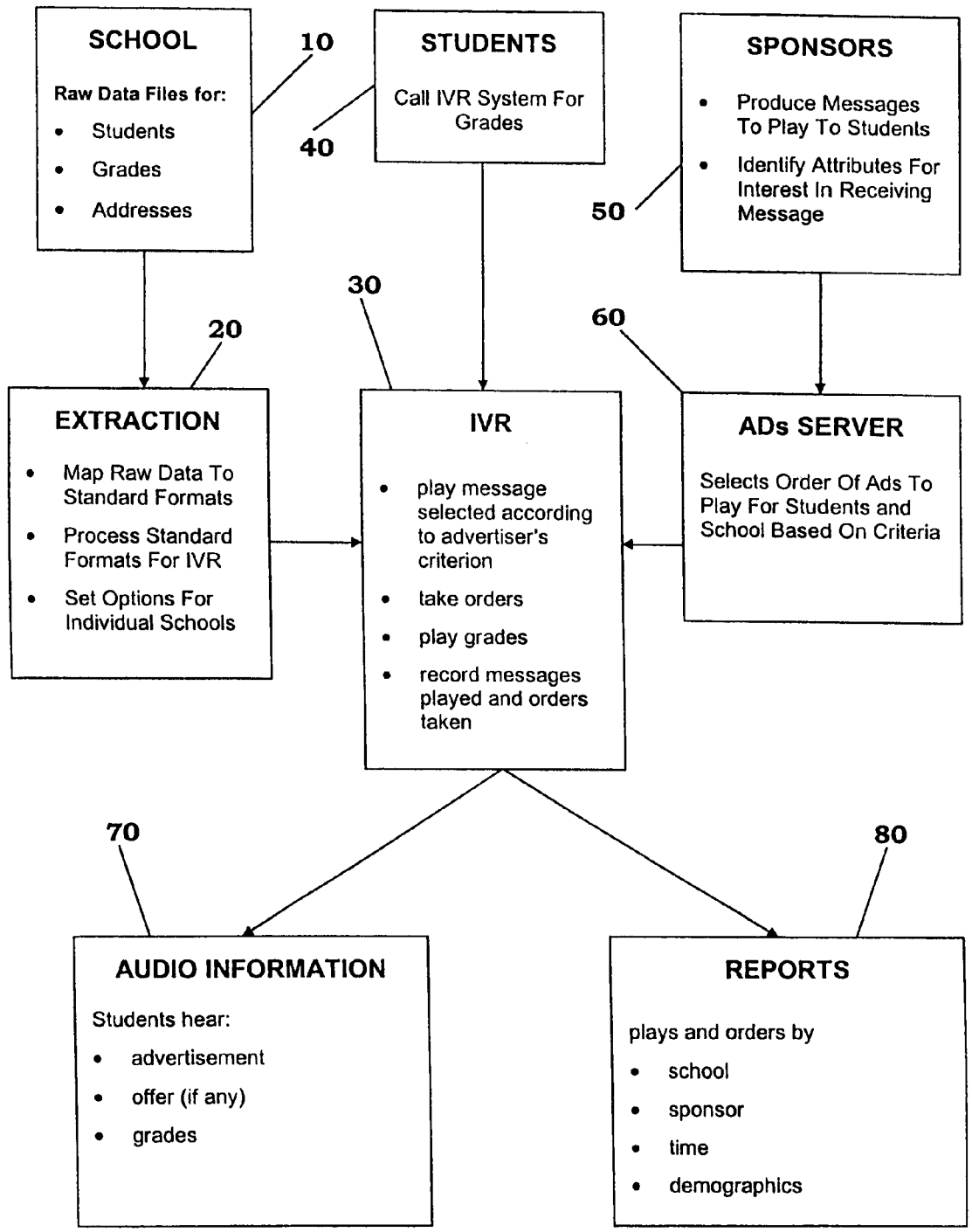
FIG. 1 shows an information delivery system that uses interactive voice response equipment according to the present invention.

FIG. 1 shows one way for implementing the present invention. A customer base, such as a school, supplies raw data files at 10. These files include the identity of students, their grades and their addresses. This information is retained in whatever form the school normally retains the information. This format is most likely incompatible with other uses of the information since there are many possible formats for presenting this data. Therefore, the raw data files are mapped into standard formats at extraction 20 for use by IVR equipment. The format of the data reports corresponds to that needed for standard IVR applications. In addition, individual schools may select different options for the audio playback. These options can be programmed into the data stream at the extraction process.

As contemplated, the extraction 20 can readily map any raw data files supplied by the school at 10 into the format needed for the present IVR application. It is to be appreciated that converting the data files into a standard IVR format permits the same IVR box to be used with different types of raw data files from many different sources. Mapping permits economies of scale to be achieved by reusing the IVR applications for multiple schools.

Individual students call to receive their grades at indicated at 40 in FIG. 1. The students call is supplied to the IVR system 30. The IVR 30 plays a message at 70 that has been selected according to criterion established by sponsors. The sponsor's message may include an offer to take an order for the product being promoted by the sponsor. The student must listen to the message and has the option of whether or not to take an order. Subsequently, the student's grades are played. A record is maintained of messages played and orders taken so that neither the same advertisement nor the same order for the same student are taken twice.

The length of time required to play the advertising message at step 30 is significant. Students generally will not tolerate a message being played for more than 30-45 seconds before they become annoyed. Therefore, the message play must be kept short for the message delivery and order taking to remain efficient. Furthermore, deciding which message to play to a given student may require some time to compute and to be accessed at the IVR 30. Students become annoyed if more than about 15 seconds is required to initiate the advertisement. Therefore, it is preferred that the advertising messages to be played to a student be computed in advance of the student 40 calling the IVR system 30.

Sponsors 50 produce advertising messages that are to be played to students. As shown in FIG. 1, a single sponsor, 50, produces the messages and identifies the attributes of a student who will be most interested in receiving the message. It is to be appreciated that the present invention contemplates serving multiple sponsors; however, the procedure for handling each sponsor will be that described herein.

The messages produced by the sponsor 50 are placed on either the ADs server 60 or the IVR 30. One function of the ADs server is to select the order of ads to be played for the students based on the criteria established by the attributes identified by the sponsor. Concentrating the ad selection process facilitates easier revision to the message selection criterion.

The primary function of the ADs server is to identify advertising messages and grade reports so that the IVR system 30 can play them to the students 40. However, as disclosed herein, the ADs server also determines which advertising messages are to be played to which students and in which order.

The raw data files received from the school can be delivered in any suitable medium, including magnetic tape, floppy disks, and telecommunications links. The extraction process can be accomplished using any suitable computer system such as those able to run Excel spreadsheets made by the Microsoft Corporation. The ADs server can be any suitable computer server system and, at present, is most often implemented using Pentium based microprocessors. The IVR system 30 can be implemented using any of several known IVR "boxes" that are well known in the industry. These systems use Pentium PC based SCO—Unix operating systems with dialogic telephony boards with RAD systems for hard drives. The system is maintained using an APEX software platform.

The present invention allows for producing several forms of outputs. The IVR system 30 generates audio information that is played to the students. This information includes, first, an advertising message for the sponsor's product or service. Next, there is an invitation, called an "offer", to purchase the sponsor's product or service. This offer may not be included in the audio information. However, it has been found that providing for accepting an offer is a particularly effective way of promoting the sponsor's product or service. Finally, the grades of the student are read out course-by-course.

Another important output of the present invention is a report that is supplied to the sponsors that shows what, exactly, their advertising money is buying. Advertisers expect that such a report will include a record of (1) which advertisements were played (2) to which students (3) at which schools which then (4) resulted in orders (if applicable). The present invention meets this need by generating reports that identify (1) the school at which the student is attending, (2) the sponsor of the advertisement, (3) the time the advertisement was played to the student, as well as (4) the number of times different messages were played, (5) the demographics of the student receiving the messages and (6) the demographics of any orders that have been taken. The sponsors can then use this information to further enhance their marketing abilities so as to identify those students who are interested in receiving their products or services. Alternately, sponsors can use the information to reassess the effectiveness of their advertising messages.

Figure 2:
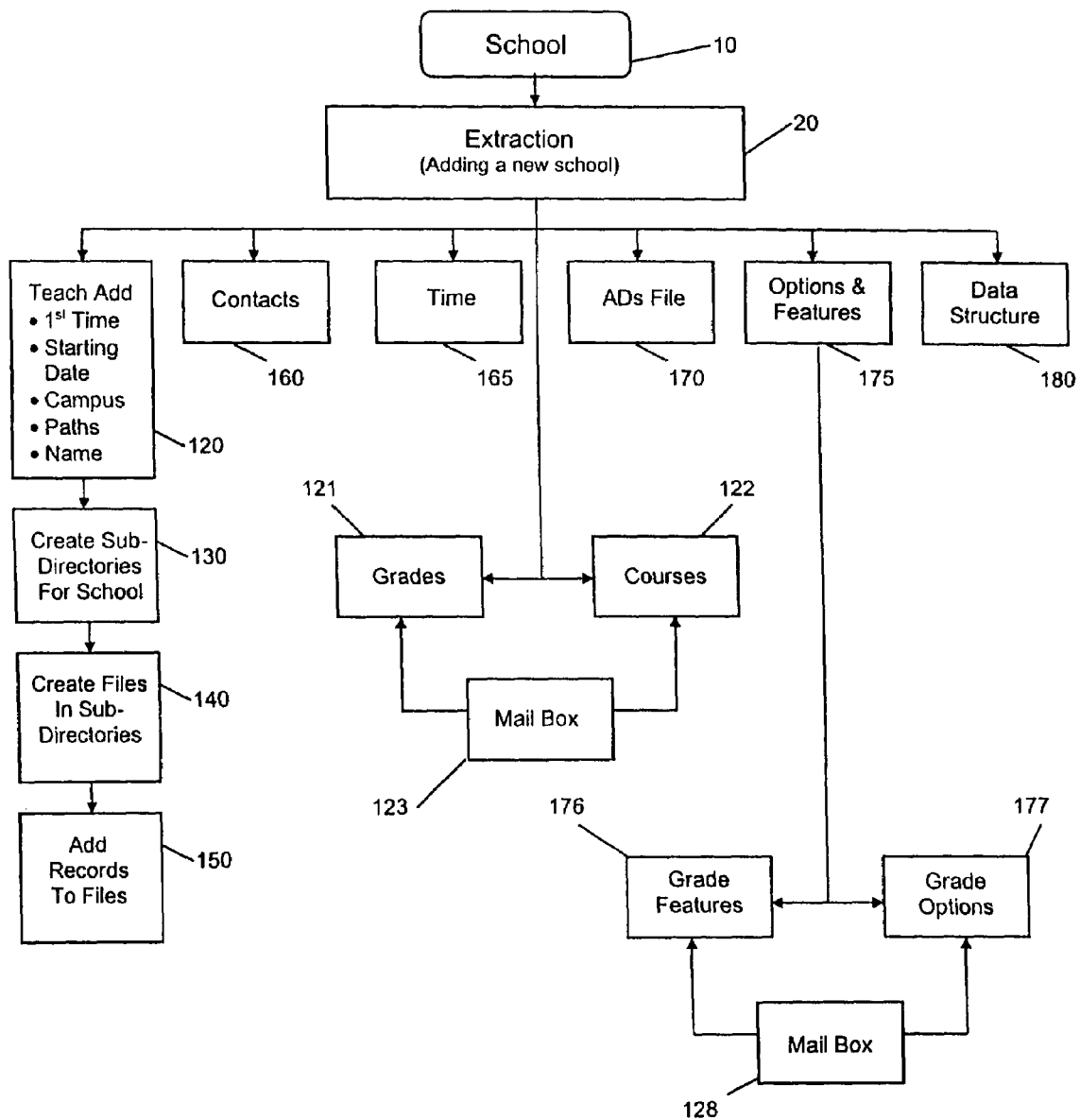
FIG. 2 shows how to map raw data files into a format that is useful for the information delivery system shown in FIG. 1.

FIG. 2 shows the process for mapping the data from schools 10 into a format suitable for use by the IVR system 30 shown in FIG. 1. Extracting the data at 20 is illustrated for purposes of adding a new school to the information delivery network shown in FIG. 1. Teaching the extraction process how to add the school's information to the appropriate portions of the database begins at 120. This information includes the starting date, the campus, the paths in the file and the name, number and code corresponding to the particular university and can be implemented in any of several ways. One advantageous way involves a series of pull down menus that prompt an operator to identify the location, in the school's data file, of the information needed by the information delivery network.

Create subdirectories for the particular school. Next, at step 140, files are created in the subdirectories. These files can include, for example, the identification of the course, the grade obtained in the course, as well as background information such as identification information (e.g., the student's social security number), address, grade-point average, and any other associated information such as major, department, etc. This information is added to the appropriate records file at 150.

It is also desirable to record the contact person at a particular school or institution so as to facilitate at 160. Likewise, it is necessary to record the times at which the particular school will be reporting its grades. It may be optimal to have different schools play different advertising messages for the same sponsor. The advertiser's preferences for particular schools can be recorded at step 170. The structure of the school's data file can be input at 180. This structure includes the location in the data fields for the student's address, grades, and identifying information such as social security numbers, personal identification numbers (PINs) and the like.

It is contemplated in the present invention that data concerning individual schools and individual students will arrive separately from data concerning grades and courses. The format for the grades can be accommodated at 121 and the form for the courses can be accommodated at 122. Individual schools will identify different courses in different ways—sometimes by course number, sometimes by course name and sometimes by hybrids (e.g., chemistry 101). The school's preference for the way it reports its grades can be identified at 122.

Likewise, the grades and course descriptions will change during a grade reporting period. As individual professors send in their grades for their respective courses. This possibility is accommodated by permitting mail from mailbox 123 to update the records of grades and courses.

Individual schools require a number of different options and features which are accommodated at 175 in FIG. 2. These options and features include grade features at 176 and grade options at 177. Different schools report grades differently—sometimes a letter, sometimes a number and sometimes combinations thereof (e.g., B+, B−, etc.). The features of a school's individual grading system accommodated and are at 176. Likewise, schools can configure their grades differently depending on which professor and which department is reporting. Such inter-school variability is accommodated at 177. The ability to update grade features and grade options is accommodated by way of mailbox 128.

Figure 3:
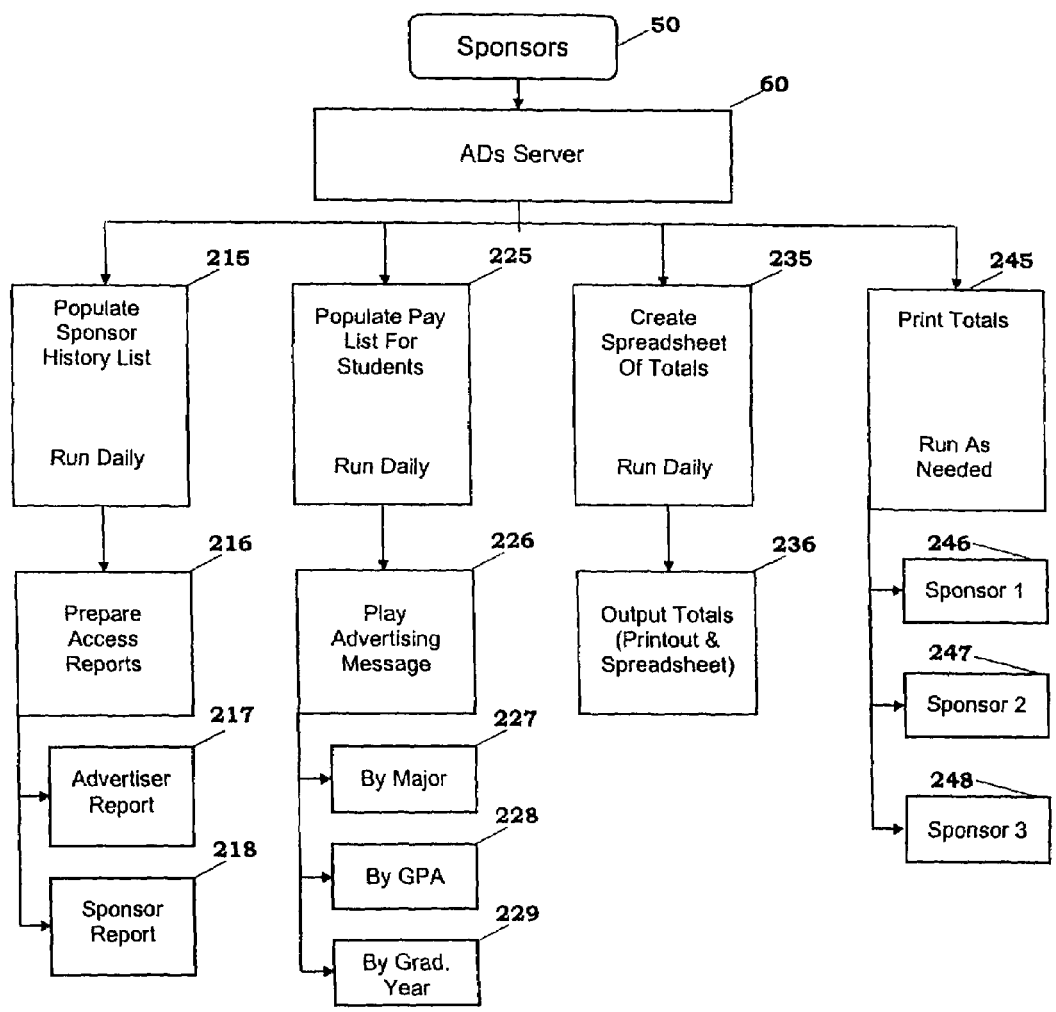
FIG. 3 shows how to generate and monitor the delivery of advertising messages in the information delivery system shown in FIG. 1.

FIG. 3 shows the operation of the ADs server 60 shown in FIG. 1. Sponsors 50 supply advertising messages that are placed on the ADs server 60. The sponsors 50 also supply attributes that will be used to determine the messages and offers directed to individual students. FIG. 3 illustrates the simplified case in which only one of three attributes 227-229 are used to select the message. The attributes, major or field of study 227, grade-point average (GPA) 228 and graduation year 229, it being understood that any number of attributes might be used to direct advertising messages.

The ADs server 60 is accomplished by populating the "play list" for students at step 225. The "play list" can be computed each time a consumer, such as a student, accesses the IVR 30. However, it is thought preferable to calculate the play list in advance for each consumer and to store the resulting play list until it is accessed by a call to the IVR 30. Such advanced calculation allows the advertising message to be played more rapidly when the consumer, e.g., the student, calls the IVR system 30 and thus reduces the time needed to actually deliver the advertising message and other information.

As shown in FIG. 3, the advertising message is played to the student at 226 according to one of the three exemplified criteria 227, 228, 229, respectively, selected by the sponsor 50. Other methods of populating the play list using the consumer's known attributes are possible.

The ADs server also maintains a history list of sponsors whose ads have been played to students. The history list 215 is converted into an access report at step 216. The access report can have any of several formats; two formats are exemplified in FIG. 3. An advertiser report 217 is useful for showing the activity of all sponsors supporting the information delivery system. A sponsor report 218 shows the activity of any one sponsor.

It is also desirable to create a spreadsheet of totals for the number of sponsors messages played for each school broken down by consumer attribute. These statistics can be created in a spreadsheet at 235 and output either as a spreadsheet or in some other desired print out form. An Excel spreadsheet is a suitable format for this information.

The history list of the sponsor 215, the play list 225 and the spreadsheet of totals 235 are operations that can be performed daily. In addition, reports can be generated for individual sponsors at 245. These reports can include break downs for the number of advertising messages played at each school by each consumer attribute. Alternately, these reports can be generated in any other way that the sponsor believes can aide in improving its message. Reports can be tailored to individual sponsors at 246-248 as desired by the sponsor.

Figure 4:
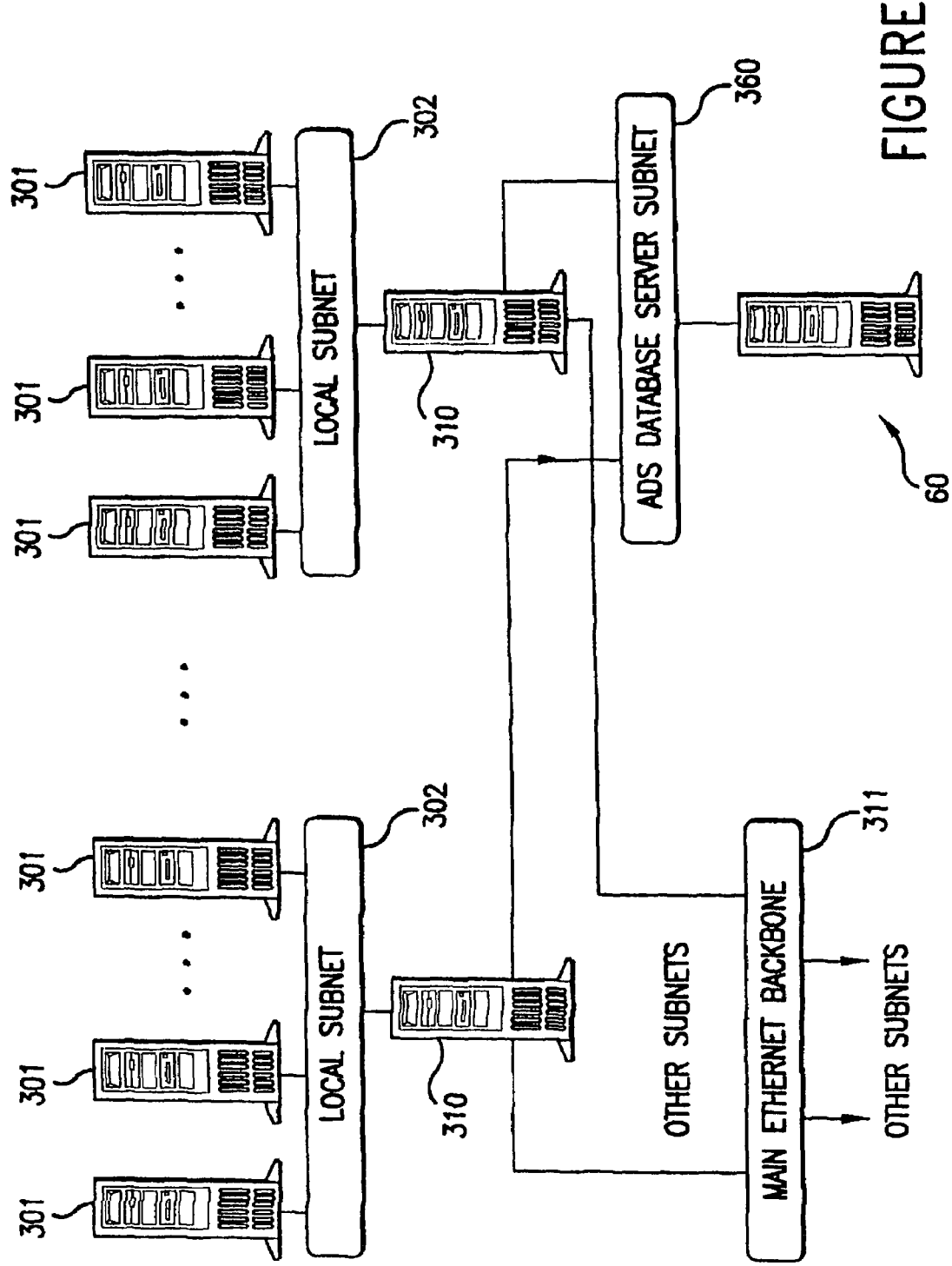
FIG. 4 shows a network of interactive voice response systems for implementing the present invention.

FIG. 4 shows the network typology and database design for the ADs server of the present invention. A plurality of IVR boxes 301 are arranged on local subnets 302 as indicated. Each of the IVR boxes can connect to a plurality of telephone lines, not shown in FIG. 4. As explained below, each of the IVR boxes 301 could serve as the IVR box 30 in FIG. 1, and it is contemplated that different IVR boxes may answer the telephone inquiry from the same consumer, e.g., student, when that student calls in at different times since multiple, redundant copies of the audio information 70 can be maintained on more than one IVR box 301.

One or more IVR gateways 310 connect the local subnets 302 to a main Ethernet backbone 311 as shown. In addition, the gateways 310 connect the local subnets 2 and ADs database server subnet 360 that includes one or more ADs servers 60.

In operation, an IVR box 301 requests the next advertising message for a given student at a particular school. This request is queued and the IVR box 301 waits for a reply. The ADs server 60 reads input requests from its queue, performs database queries with associated processing and formats an application response. The response is then placed in a queue at ADs server 60 and delivered back over the network to the IVR boxes 301. In one embodiment of the invention, each IVR box 301 retains a complete copy of all voice messages that can be played to a consumer that is capable of accessing a phone line directed to the IVR box. Distributing voice messages among the IVR boxes 301 serves to reduce network traffic and thus reduces the delay experienced by a customer placing a call. However, it should be possible to incorporate a voice server into the ADs database server 60 so as to deliver the appropriate voice message to the IVR boxes 301. The appropriate distribution of voice messages within the network depends on the speed of the network, the response time desired for the voice messages, etc., and is considered to be within the level of skill of one of ordinary skill in the art to optimize.

Referring again to FIG. 4, the software for the gateways 310 can run on a single IVR gateway system and then be migrated to a full client server as the needs of the network grow. Each IVR box 301 can make a request from ADs server 60. Similarly, each IVR box 301 can designate the ADs server 60 as having the post name to its designated IVR gateway system. Hence, network maintenance can be removed from the IVR application.

Under one implementation of the invention, an IVR box 301 receives a call from a student. The IVR box identifies which school the student attends from the toll-free phone number used to call the IVR box. The student is then prompted to input his or her identification number. The IVR box is programmed with a maximum number of advertising messages to play to the student as well as the maximum duration of any particular advertising message (these variables may be unique to a particular school). This information is encoded and transmitted over the network to the ADs server 60. In response, the ADs server 60 returns a message containing the school code, the student identification information and a list of the ads that are to be played in the order in which they are to be played. The IVR box 301 then returns information pertaining to the delivery of the advertising message, including an identification of the school, the student's identification and the date and time on which a particular advertising message was played. Also returned to the ADs server is an indication of whether the student responded to any offer presented by the IVR box 301. This information is then compiled for use in reports as discussed previously.

The ADs server 60 uses the information returned from the IVR box 301 to ensure that the student does not receive the same ad again when calling again even if his or her call is routed through a different IVR box 301. This function is achieved by indexing down the maximum number of ads to be played and by removing the played ads from the list of ads to be played. As contemplated for one implementation, the confirmation by the IVR box 301 of the delivery of an advertising message to the student is contained in the same file as the indication of whether the student accepted any offer made. Combining these messages into a single file reduces the processing and reporting time required to generate reports.

For implementing the present invention in the particular application of student grade reporting, it is contemplated that the ADs server database contain a record for every student from every school served by the system. Each student record contains a command indicating the play list of advertising messages that are to be delivered to the student in the order in which they are to be delivered. In addition, a separate list is maintained in the record to indicate whether any offers made have been accepted as well as to indicate which advertising messages have been delivered. These messages are then removed from the student's play list at the ADs server 30.

Figure 5:
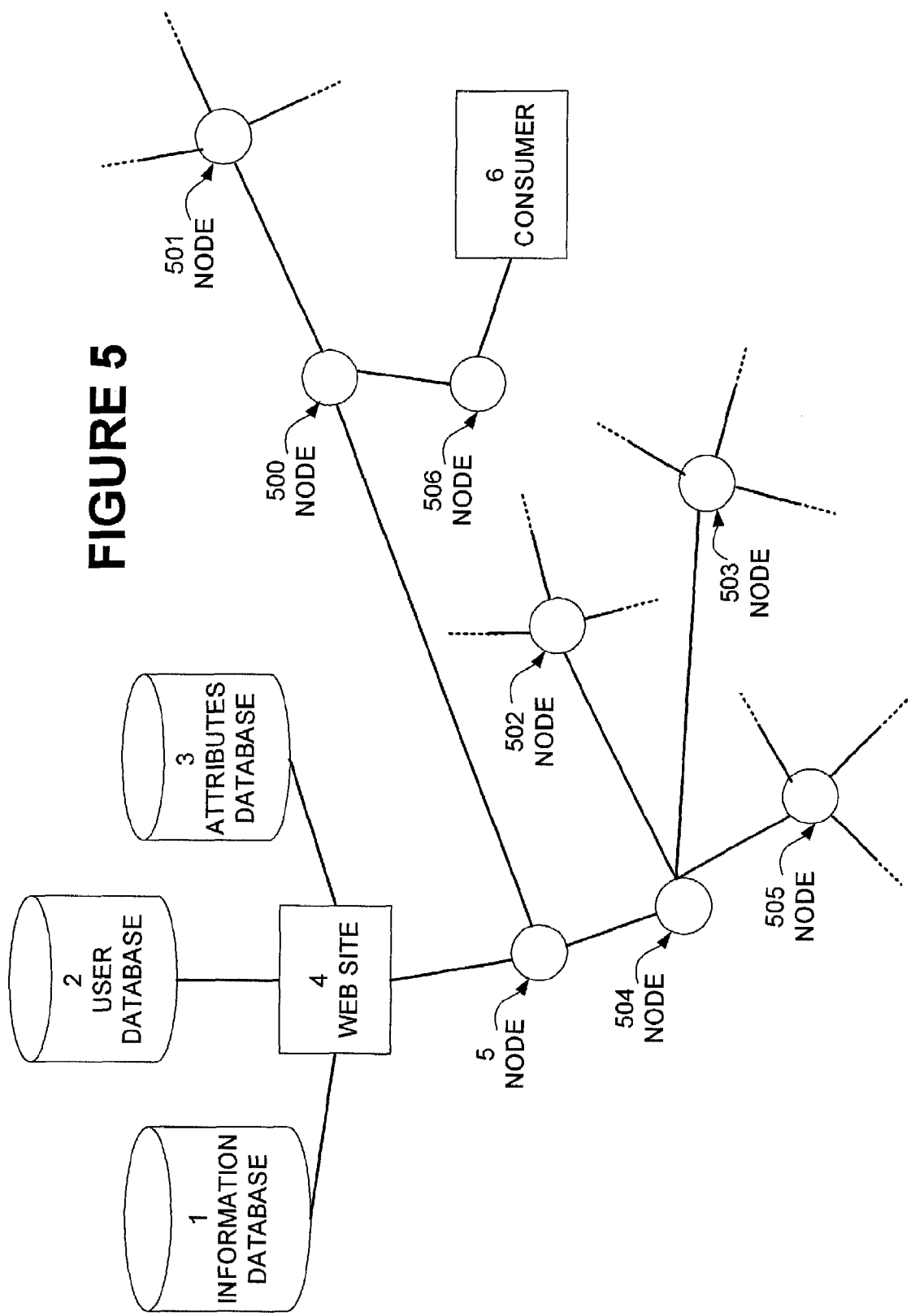
FIG. 5 shows one embodiment of the present invention in which an Internet user accesses databases at a given Web site.

FIG. 5 shows three databases 1-3 connected to a Web site 4. The databases 1-3 may be physically resident on one or more servers at the Web site. The selection of servers for the databases are deemed to be within the level of skill of one of ordinary skill in the art. Alternately, one or more of the databases may be located remote from the Web site and connected thereto over a suitable connection such as high speed fiber optic cable, telephone line, local area network (LAN), intranet, Internet, or World Wide Web. The Web site 4 is connected to the Internet, or World Wide Web, at a node 5. This node is a part of the general information transfer network, such as the Internet or World Wide Web, which comprises symbolically a series of interconnected nodes 500, 501, 502, 503, 504, 506 in a manner known in the art. This interconnection is referred to herein as the "Internet" for simplicity since the distinctions among the Internet, the World Wide Web, and various "intranet", LANs and the like is not critical.

As shown in FIG. 5, informational database 1 contains a type of information which the consumer 6 who is using the Internet desires to access. The consumer 6 contacts Web site 4 through the Internet in a manner that is well known in the art. Upon accessing the Web site 4, software resident in the Web site 4 identifies the consumer 6 in user's database 2. This identity preferably comprises attributes of the consumer's "real" world identity. These can include, inter alia, information about the consumer which is already known, information which the consumer voluntarily supplies, information which is gleaned from the consumer's responses to advertising messages or hot link choices while visiting this or other Web sites, information on the consumer's present or past responses to advertisements and offers, and information gleaned by cross referencing any of the foregoing information with other sources such as magazine subscriptions, credit card approvals, census data, etc. The attributes of database 3 include a variety of characteristics, tastes, preferences, and other information unique to the consumer 6, including, for example, the age, sex, weight, height, residence, income level, and other group interest or personal preference. These individual characteristics are referred to herein as "attributes" with the understanding that such attributes can include any information pertaining to what makes a person a unique individual.

Software uses the attributes of the consumer 6 to select an advertisement loaded in database 2 as explained below. The Internet then transmits the selected advertisement or offer from database 2 and the information contained in database 1, either sequentially or simultaneously, to the consumer 6. The manner of information transmission can comport with any of several standard publishing protocols for the Internet and is considered to be within the level of skill of one of ordinary skill in the art.

Figure 6:
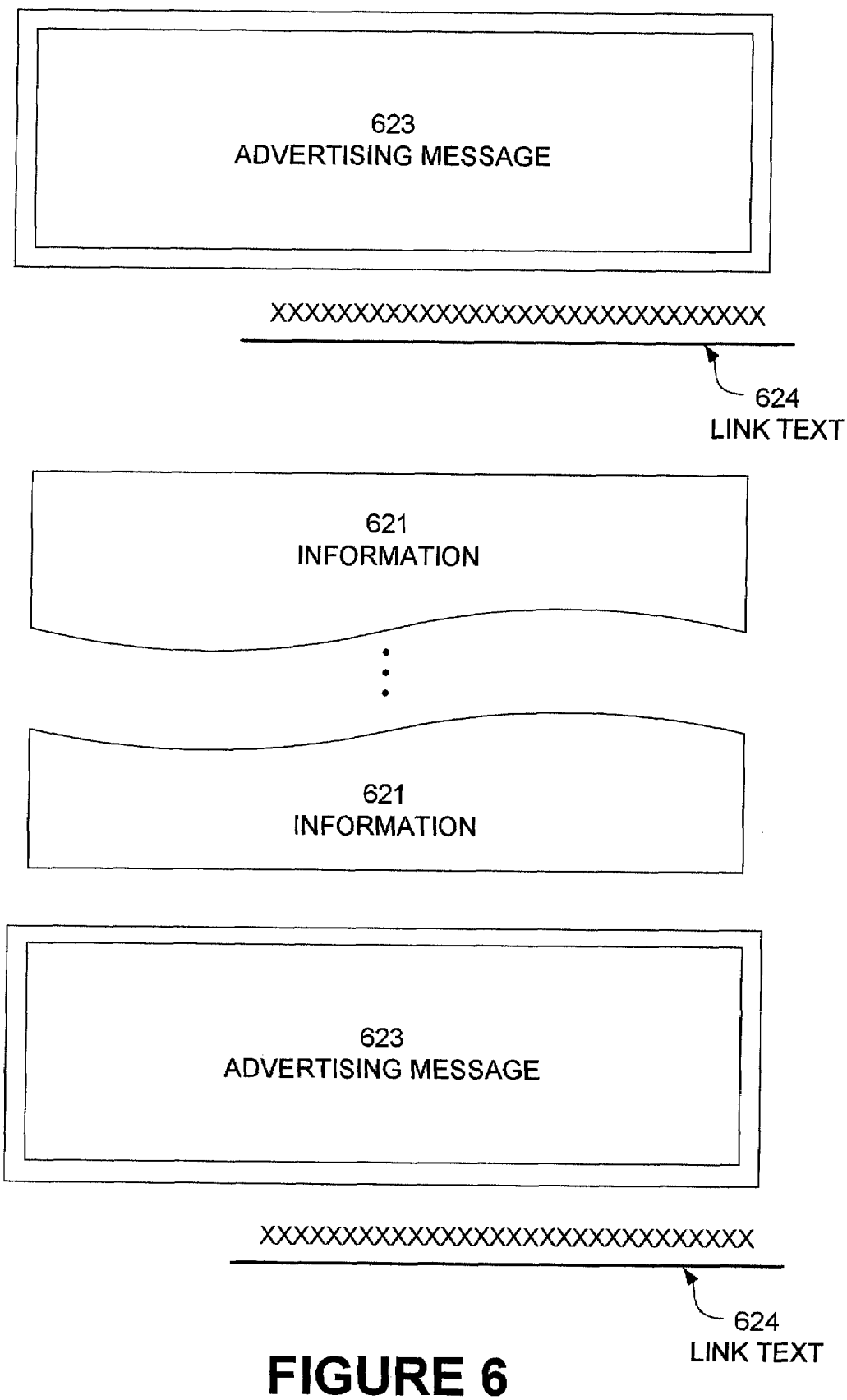
FIG. 6 shows one way to deliver information in accordance with the present invention.

FIG. 6 shows one way of displaying the information from databases 1 and 2 to the consumer 6. The advertising message from database 2 is shown as being displayed in area 623. The information from database 1 is displayed in the area indicated as 621.

The advertising message in area 623 may comprise a separate screen. Alternately, the advertising message in area 623 can be displayed simultaneously with the information in area 621. The simultaneous display of the information with the advertising message is thought to reduce the chance of the consumer simply flipping to the next screen of information and is therefore considered preferable. As shown in FIG. 6, the advertisement area 623 both precedes and follows the display of the information 621 in contemplation that the information area 621 will be larger than a single screen.

It is contemplated that the consumer 6 will desire the information contained in area 621. It is therefore considered desirable to keep the advertising message displayed in area 623 limited so as not to become annoying.

It is possible that the information sought by the consumer 6 will occupy more than a single screen. In such an instance, the consumer 6 will need to scroll to additional screens. It is therefore possible to display advertising message 623 again for each screen of information in area 621. The advertising message area 623 may contain the same information in each screen. In addition, however, the advertising message area 623 can be used to display other advertising messages selected by the software at the Web site 4. In this way the consumer 6 can receive multiple advertising message at the same time as he or she receives the desired information in area 621. This result is achievable by displaying a different advertisement each time the Internet transmits a different screen to the consumer. It is desirable that the ads be selected so as to minimize, or avoid entirely, repeating any one advertising message to the consumer 6.

Figure 7:
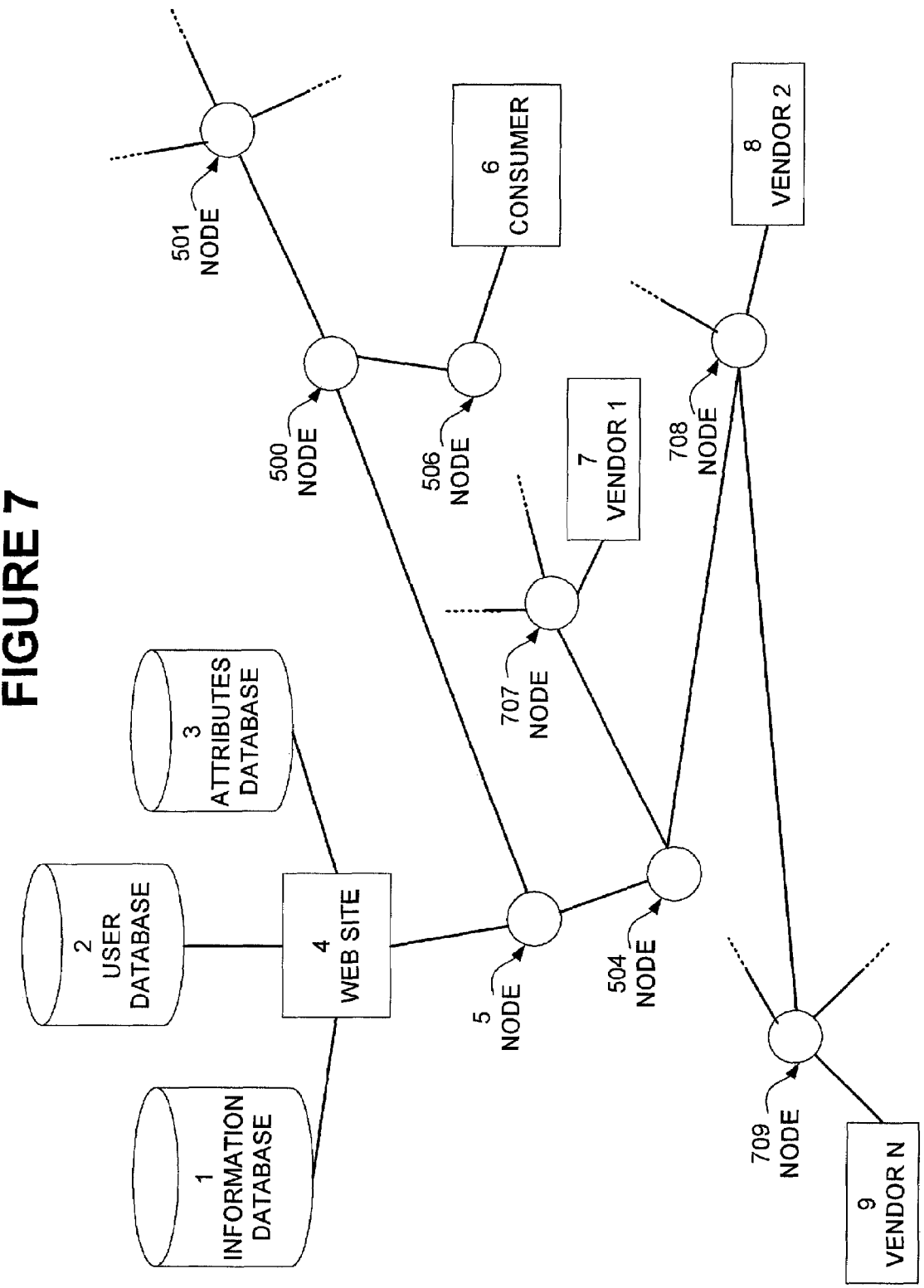
FIG. 7 shows an alternate embodiment of the present invention in which a consumer can interact directly with an advertiser or marketer.

FIG. 7 shows another way to implement the present invention. The databases 1-3, Web site 4, consumer 6 and Internet connection nodes 5, 500, 501, 504, 506 are the same as shown in FIG. 5. In addition, however, additional Internet connections have been established at 7-9 representing vendor $V_1$, $V_2, \ldots V_N$. The vendors are connected through nodes 707, 708 and 709, respectively. It is contemplated that these nodes will be standard. Internet connections, the design of which lies within the level of a person of ordinary skill in the art. The consumer 6 can click on link text 624 in FIG. 6 so as to directly access the Web site of the vendor supplying the advertisement in space 623. In this way the consumer 6 can be put in direct contact with a vendor offering goods or services of interest to the consumer 6.

As shown in FIG. 7, the consumer 6 accesses the vendor's $V_1$-$V_N$ over the Internet in the same manner as the consumer accesses the Web site 4 containing the desired information. It is to be appreciated that this is only one of many possible embodiments of the present invention. For example, one or more of the vendors could be resident at the Web site 4.

Figure 8:
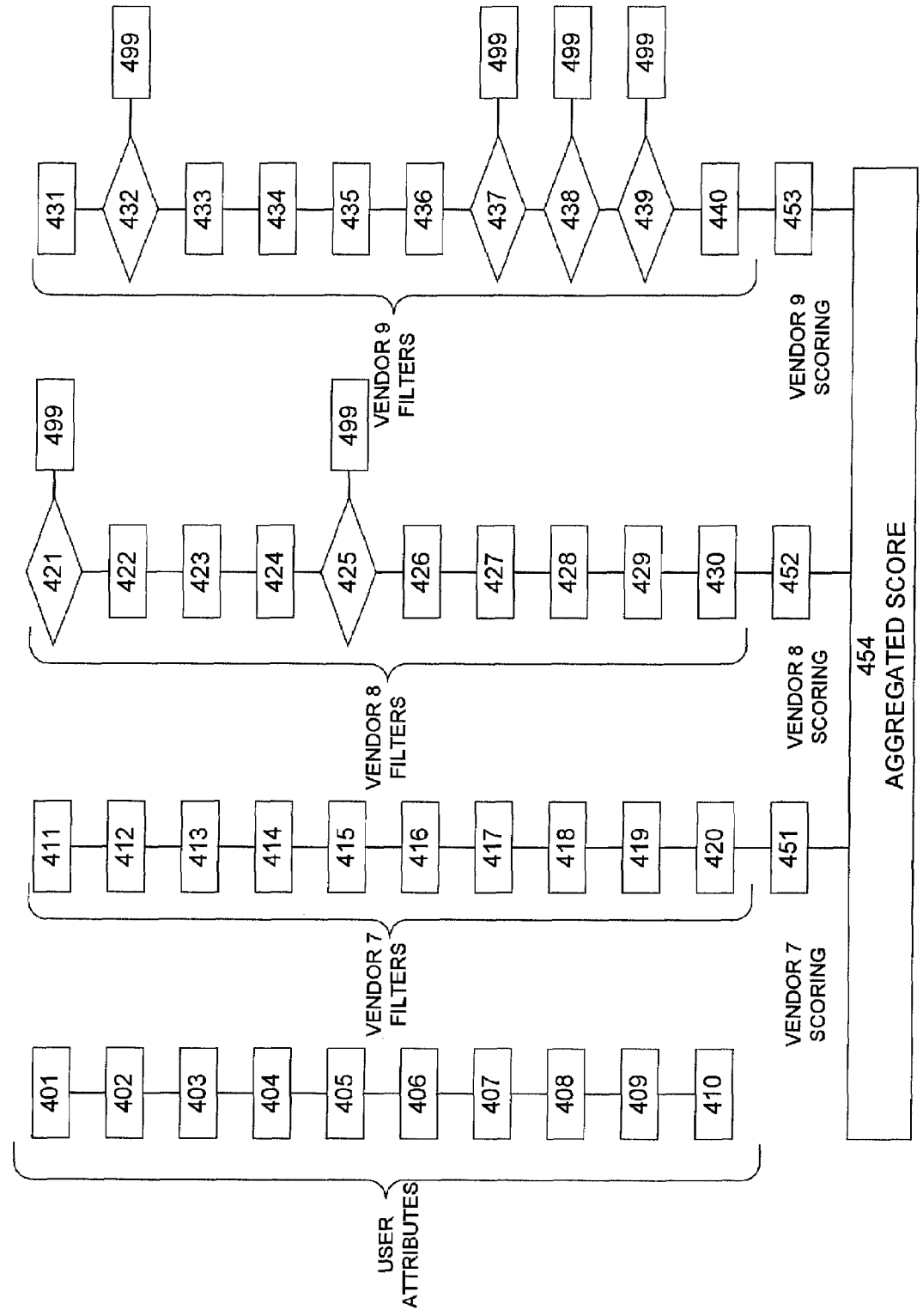
FIG. 8 shows a way of evaluating consumer attributes so as to select an advertisement to be displayed in FIG. 6.

FIG. 8 illustrates one way of ascribing attributes for the purpose of selecting an advertisement to be displayed. The consumer 6 has 10 attributes 401-410. These attributes represent codes responses attained or gleaned from any of the information sources identified above. These attributes can be of any number but are illustrated here as being 10 in number. When the consumer is identified at the Web site 4, these 10 exemplary attributes are recalled from the database 2 so as to be used in computing which ad to display. As illustrated in FIG. 8 the advertiser 7 screens the 10 attributes at decision steps 411-420. These attributes can then be scored and totaled at step 451 according to weights established by vendor 1. Vendors 8 and 9 go through a similar process. However, as illustrated, vendor 8 has a filter employed at steps 421 and 425 such that this vendor's advertisement will not be played to certain consumers. Likewise, vendor 9 has a different set of filter decision steps 432 and 437-439. The total scores for each of the vendors from steps 421-430 and 431-440, respectively, are totaled at steps 452 and 453, respectively. The combined scores from the various vendors are then ranked and ordered at decision step 454 to determine the advertisement to be displayed in space 623 in FIG. 6 In this way it is possible for a vendor to select a particular advertisement to direct to the consumer 6 according to that consumer's attributes.

One example of a database assembled according to FIG. 8 is for students inquiring of their semester grades. A university knows a considerable number of attributes regarding individual students as described above. These attributes can be coded and used to select among possible advertising messages so as to display to the student an ad of greatest possible interest.

Matching Web site consumers to particular advertising messages is a "human intelligence" task that is not easily coded as database queries. The problem of assigning many ads to several hundred thousand potential consumers is arduous. In addition, the attributes of the consumers are often not easily obtainable in a timely manner. Consequently, a tool to assist an advertiser or direct marketer in assigning ads to students in a grade reporting system is essential and should be capable of providing the capabilities listed in the following table.

| Requirement Name | | Capability |
| --- | --- | --- |
| Customer Ad Limits | 1. | The ability to limit the number of ads that can be assigned to each student. |
| Student Counts | 1. | The ability to count the number of customers with a specific set of selects. For example, the ability to count the number of customers from 4 year private schools who are male freshman. |
| | 2. | The ability to graphically display distributions of customer selects. For example, display a pie chart distribution of the customers by attributes and gender. This would be a visual way to verify a uniform distribution of customers in the population. Another example would be to display the distribution of students by school type. |
| Customer Ad Counts | 1. | The ability to count the number of customers who have a particular number of ads assigned t them. For example, it may be desirable to count the number of customers who have 3 or fewer ads assigned to them. |
| | 2. | The ability to graphically display the distribution of the number of ads assigned to each customer. |
| Customer Ad Distributions | 1. | The ability to graphically display the counts and distribution of ads across the customer population. |
| Customer Ad Assignment | 1. | The ability to assign an ad or list of ads to customers with a particular set of selects. |
| | 2. | The ability to assign an ad or list of ads to customers based on the number of ads already assigned. |
| Customer Ad Deletion | 1. | The ability to remove an ad or list of ads from a group of customers defined by a particular select set. |
| | 2. | The ability to remove an ad from a list of customers who have a particular number of ads assigned to them. |
| Customer Ad Dump | 1. | When the ad selection process is completed, the ads for each customer shall be dumped to a database file so that the attributes can be placed on the Ads Database Server on-line without service interruption. |

This is an exemplary list of the requirements for one selecting an ad to display over the internet. The design of the tool used to implement this configuration is exemplary.

One important consideration is the amount of time that is required to deliver the message to the consumer. The delay involved in the round trip to the consumer is preferably be no longer than 2 seconds. It is undesirable to keep a customer waiting longer for a longer period of time while computing the next ad to play. Also, a lengthy delay will break the flow the introduction to the advertising message. Therefore, in the event that the server for the database of advertisements does not respond within the specified period of time, the server supplying the advertising messages on database 2 can display a default message. Maintaining a sufficiently rapid turn around is a function of the server being used, the selection of which is within the level of skill of a person of ordinary skill in the art.

Once a consumer decides to review an advertising message, that message need no longer be offered to that same consumer. However, the advertising message database 2 can display messages to the consumer even if the consumer has received the messages previously but did not respond to it. Advertising messages may also involve a hypertext link to the vendor's server or simply display a toll-free ("800") number or a local call to call. This feature can be designed into an the advertising message area 621.

The selection algorithm can be implemented using Windows NT since it provides the capability of connecting to networks, scaleable processing and ease of connectivity to many machines running server software. This approach allows an NT database server to be migrated across many different platforms. Consequently, the computer system running the NT SQL server need not remain the same as the demands on the server grow.

There is no limit necessarily to the number of lines web site visits that the server supporting advertising message database 2 can simultaneously support. There are several reasons for this. The advertising message database 2 server supports all users that are necessary to support the number of consumers who are concurrently on-line. The server for database 2 can be designed to be scaleable in both hardware and software. It should be possible to handle thousands of simultaneous logons.

Figure 9:
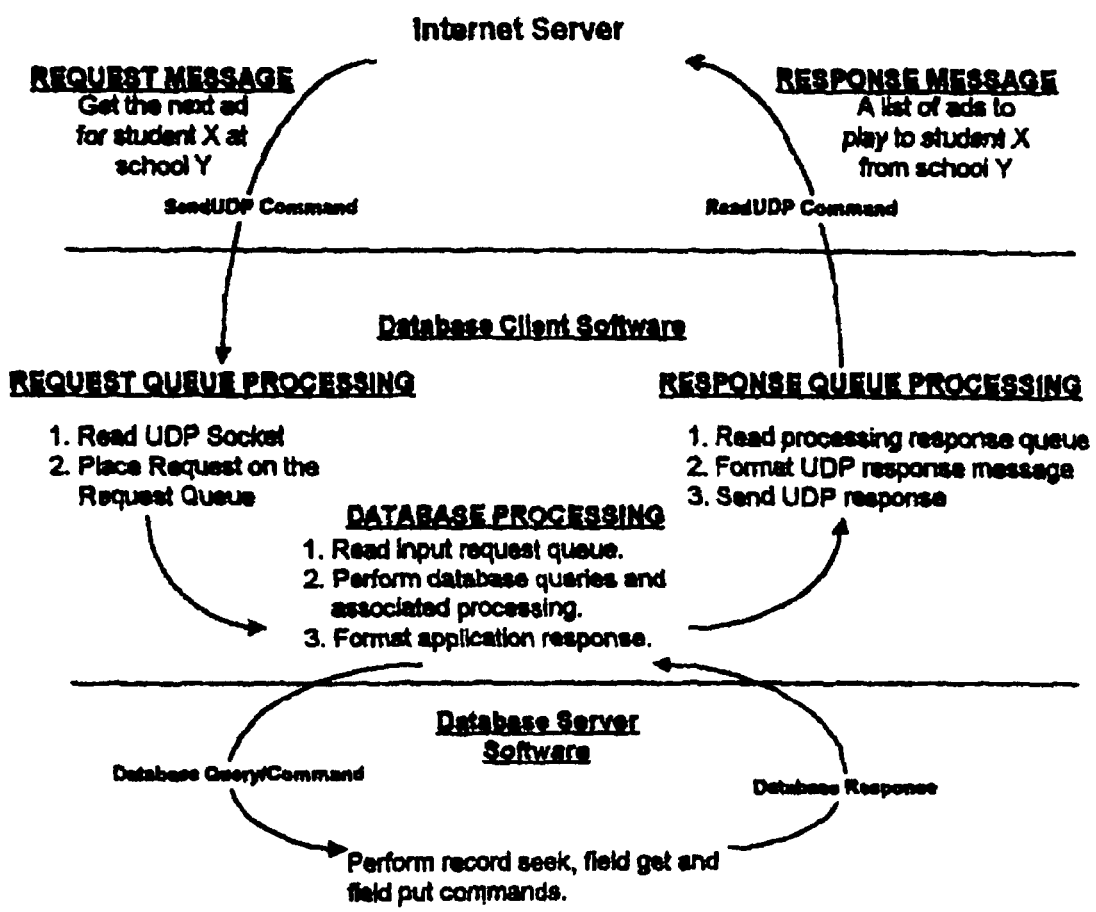
FIG. 9 shows more detail for creating the software for evaluating consumer attributes.

FIG. 9 shows how software written for an interactive voice response system can be seamlessly adapted to the internet application described and claimed herein. Additional specifications and requirements for preparing the software are attached as the appendix to this patent application.

It is to be appreciated that other databases could be constructed using any set of attributes. For example, the database 2 could be used to comprise a form of home shopping system in which consumers filled out a questionnaire in exchange for receiving potentially interesting advertisements. Such a system would offer a great advantage over the conventional television shopping programs and networks. Likewise, the first information contained in database 1 could comprise any form of information of interest to consumers. This information could include newspaper articles, movie listings, or vocational and technical information. The advertisements displayed can be adopted in real time to correspond to the consumer's browsing and purchasing decisions. Likewise, the type and level of detail of the information displayed in area 621 could be adapted to take into account the consumer's purchasing decisions, thereby rewarding better customers with more of the information which they seek.

The principles, preferred embodiments and modes of operation of the present invention have been set forth in the foregoing specification. The embodiment disclosed herein should be interpreted as illustrating the present invention and not as restricting it. The foregoing disclosure is not intended to limit the range of equivalent structure available to a person of ordinary skill in the art in any way, but rather to expand the range of equivalent structures in ways not previously thought of. Numerous variations and changes can be made to the foregoing illustrative embodiments without departing from the scope and spirit of the present invention as set forth in the appended claims.

What is claimed is:

1. A method of providing advertising over a network comprising:
   applying an informational database at a web site, wherein the informational database comprises information sought by a user;
   associating an identifier with the user to access the information, wherein the identifier uniquely identifies the user;
   associating attributes with the user identifier, wherein the attributes identify interests of the user;
   applying an advertising database at the web site, wherein the advertising database comprises at least one advertising message that is transmittable over the network;
   receiving a request for the information to the website from the user, wherein the request comprises the user identifier;
   selecting an attribute associated with the user identifier from the informational database;
   selecting an advertising message from the at least one advertising message based on the selected attribute; and
   transmitting the selected advertising message and the information to the user over the network.

2. The method of advertising over the network as claimed in claim 1, wherein the informational database further comprises information sought by the user and wherein the method further comprises:
   selecting an additional advertising message based on the selected attribute; and
   transmitting the additional selected advertising message and the additional information to the user over the network.

3. The method of directed advertising over the network as claimed in claim 2, wherein the additional advertising message differs from the advertising message previously transmitted.

4. The method of directed advertising over the network as claimed in claim 2, wherein each additional advertising message is the same as the advertising message previously transmitted.

5. The method of providing advertising over the network according to claim 1, wherein the information sought by the user comprises student grades.

6. The method of providing advertising over the network, according to claim 1, wherein the selected attribute is the name of the user.

7. The method of providing advertising over the network, according to claim 1, wherein the informational database is a single database.

8. The method of providing advertising over the network, according to claim 1, wherein the informational database comprises more than one database.

9. The method of providing advertising over the network, according to claim 1, wherein at least one of the informational database and the advertising database is physically resident on at least one server at the web site.

10. The method of providing advertising over the network, according to claim 1, wherein at least one of the informational database and the advertising database is located remote from the web site.

11. The method of providing advertising over the network according to claim 1, wherein the informational database is provided by a first party and the advertising database is provided by a second party.

12. The method of providing advertising over the network according to claim 1, wherein the network is the Internet.

13. The method of providing advertising over the network according to claim 1, wherein the attributes are selected from the group consisting of characteristics, tastes, preferences, age, sex, weight, height, residence, and income level.

14. The method of providing advertising over the network according to claim 1, wherein the attributes are obtained from at least one source selected from the group consisting of the user, responses of the user to an advertising message, web browsing data, magazine subscription data, credit card data, scholastic data, and census data.

15. A method of providing advertising over a network comprising:
- applying an informational database at a web site, wherein the informational database comprises information sought by a user;
- associating an identifier with the user to access the information, wherein the identifier uniquely identifies the user;
- associating attributes with the user identifier, wherein the attributes identify interests of the user;
- applying an advertising database at the web site, wherein the advertising database comprises at least one advertising message that is transmittable over the network and a vendor link for contacting over the network a vendor sponsoring the advertising message,
- receiving a request for the information to the website from the user, wherein the request comprises the user identifier;
- selecting an attribute associated with the user identifier from the informational database;
- selecting an advertising message from the at least one advertising message based on the selected attribute; and
- transmitting the selected advertising message, the information and the vendor link to the user over the network,
- and connecting the user to the vendor when the user activates the vendor link.

16. The method of making offers over the network as claimed in claim 15, wherein the informational database further comprises information sought by the user and wherein the method further comprises:
- selecting an additional advertising message based on the selected attribute; and
- transmitting the additional selected advertising message and the additional information to the user over the network.

17. The method of making offers over the network as claimed in claim 15, wherein the additional advertising message differs from the advertising message previously transmitted.

18. The method of making offers over the network as claimed in claim 15, wherein the additional advertising message is the same as the advertising message previously transmitted.

19. The method of making offers over the network, according to claim 15, wherein the information sought by the user comprises student grades.

20. The method of making offers over the network, according to claim 15, wherein the selected attribute is the name of the user.

21. The method of making offers over the network, according to claim 15, wherein the informational database is a single database.

22. The method of making offers over the network, according to claim 15, wherein the informational database comprises more than one database.

23. The method of making offers over the network, according to claim 15, wherein at least one of the informational database and the advertising database is physically resident on at least one server at the web site.

24. The method of making offers over the network, according to claim 15, wherein at least one of the informational database and the advertising database is located remote from the web site.

25. The method of making offers over the network, according to claim 15, wherein the informational database is provided by a first party and the advertising database is provided by a second party.

26. The method of making offers over the network according to claim 15, wherein the network is the Internet.

27. The method of making offers over the network according to claim 15, wherein the attributes are selected from the group consisting of characteristics, tastes, preferences, age, sex, weight, height, residence, and income level.

28. The method of making offers over the network according to claim 15, wherein the attributes are obtained from at least one source selected from the group consisting of the user, responses of the user to an advertising message, web browsing data, magazine subscription data, credit card data, scholastic data, and census data.

* * * * *